United States Patent [19]

Ionides

[11] Patent Number: 5,117,980

[45] Date of Patent: Jun. 2, 1992

[54] DRINKING DEVICE AND HOLDER

[76] Inventor: Christos G. Ionides, 1 Mill Corner, Hadley, Barnett, London EN5 4PX, England

[21] Appl. No.: 611,826

[22] Filed: Nov. 13, 1990

[30] Foreign Application Priority Data

Nov. 13, 1989 [GB] United Kingdom ............... 8925637

[51] Int. Cl.⁵ .............................................. B65D 85/00
[52] U.S. Cl. ...................................... 206/553; 206/37;
206/349; 206/493; 206/525; 220/4.23; 220/306;
220/717
[58] Field of Search ................... 220/90.2, 90.6, 4.22,
220/4.23, 700, 701, 716, 717, 718, 306; 206/37,
349, 493, 525, 553

[56] References Cited

U.S. PATENT DOCUMENTS

| | | | |
|---|---|---|---|
| 1,500,133 | 7/1924 | Kaufman | 206/349 X |
| 2,059,070 | 10/1936 | Wershay | 220/90.6 |
| 2,094,869 | 10/1937 | Ballard | 220/90.2 X |
| 2,317,046 | 4/1943 | Fleming | 220/90.6 |
| 2,504,485 | 4/1950 | Allen | 206/493 X |
| 2,675,457 | 4/1954 | Privett | 220/4.22 X |
| 2,678,142 | 5/1954 | Creed | 220/90.6 |
| 2,969,140 | 1/1961 | Avetta | 206/349 |
| 3,136,398 | 6/1964 | Platt | 220/4.22 X |
| 3,197,089 | 7/1965 | Michael | 220/717 X |
| 3,302,858 | 2/1967 | Miller | |
| 3,429,478 | 2/1969 | Ward | 220/717 |
| 3,690,509 | 12/1972 | Kinoian et al. | |
| 4,098,439 | 7/1978 | Blow, Jr. et al. | 220/90.6 X |
| 4,234,099 | 11/1980 | Tarro | |
| 4,339,053 | 7/1982 | Tarro | |
| 4,340,139 | 7/1982 | Wilcox et al. | 220/4.22 X |
| 4,387,826 | 6/1983 | Heubl | 220/243 |
| 4,415,097 | 11/1983 | Meins | 220/90.4 |
| 4,541,528 | 9/1985 | Holmes | 220/4.23 X |
| 4,561,705 | 12/1985 | Schäfer | 312/244 |
| 4,579,257 | 4/1986 | Brändlein | 222/192 |
| 4,586,625 | 5/1986 | Garrett | 220/266 |
| 4,679,702 | 7/1987 | Maccarone et al. | 220/307 X |
| 4,703,873 | 11/1987 | Geren | 222/192 |
| 4,715,510 | 12/1987 | van der Meulen et al. | 220/90.4 |
| 4,717,037 | 1/1988 | van der Meulen | 220/90.6 |
| 4,752,016 | 6/1988 | Eads | 220/253 |
| 4,852,776 | 8/1989 | Patton | 222/570 |
| 4,869,389 | 9/1989 | Cerrone, Jr. | 220/90.2 |
| 4,883,192 | 11/1989 | Krugman | 220/855 P |
| 4,928,825 | 5/1990 | Hehn | 206/493 X |
| 4,961,510 | 10/1990 | Dvoracek | 220/90.4 |
| 5,018,635 | 5/1991 | Whittaker | 220/90.2 |

FOREIGN PATENT DOCUMENTS 8201759  11/1983  Netherlands ..................... 220/90.2

Primary Examiner—Stephen P. Garbe
Assistant Examiner—Stephen Cronin
Attorney, Agent, or Firm—Hoffman, Wasson & Gitler

[57] ABSTRACT

A reusable drinking device is provided for use with a can having an opening in its upper surface and an upstanding rim. The device is executed in plastic and clips onto the rim to cover over areas of the upper surface of the can adjacent the opening, while leaving the opening free for egress of liquid.

3 Claims, 2 Drawing Sheets

DRINKING DEVICE AND HOLDER

BACKGROUND OF THE INVENTION

This invention relates to a drinking device.

Drinks are now commonly sold in cans which are of a circular sectioned cylindrical shape with an upstanding rim at each end. The cans include a means for opening them, normally a ring pull tab, which forms an opening in the top surface of the can inside the upstanding rim surrounding the top surface.

Many people drink directly from the can and in this case their lips will contact the areas on the top and side of the can adjacent the opening. Since cans are transported and stored in all sorts of conditions they may be dusty or otherwise dirty in these areas and drinkers can pick up infections from such contact.

PRIOR ART

U.S. Pat. Nos. 3302858 and 3690509 each propose a hygenic, removable and disposable cover secured over the opening area of a can as sold. U.S. Pat. Nos. 4234099 and 4339053 propose a slidable cover member permanently fixed to a can and disposable therewith. I am not aware that any of these proposals are available in the market place because they add considerably to the cost of the can and are not reusable.

SUMMARY OF THE INVENTION

An object of this invention is to provide a reusable drinking device for use with such a can, which device will prevent the drinkers lips coming into direct contact with the can.

Accordingly in one form the invention provides a reusable drinking device separate from a can, shaped to clip onto the rim of a can in the region of the can opening and to provide a cover over the areas of the can adjacent the opening.

In a preferred form the drinking device, made of moulded plastics material, has a generaly horizontally extending portion adapted to contact the top surface of a can adjacent an opening and itself defining a channel for alignment with the can opening for passage of drink, a generally upright portion shaped to contact the cylindrical side of a can below the opening, the generally horizontal and upright portions being connected by a rim portion defining a downwardly opening channel adapted to clip over the rim of a can so as to detachably retain the device on the can.

The lower surface of such a drinking device which contacts the can in use may itself pick up dust or other dirt from the can. Since the user may wish to use the device for another drink before he has a chance to wash it, the invention, in another aspect, extends to a holder for the drinking device, which holder includes a part of similar shape to the part of a can adjacent its opening so that the device can be mounted in the holder when not in use, so that its outer surface will not pick up dirt from its inner surface and the device will be readily available for reuse.

BRIEF DESCRIPTION OF THE DRAWINGS

One embodiment of drinking device and holder therefor will now be described, by way of example only, with reference to the accompanying drawings of which.

DETAILED DESCRIPTION OF ONE EMBODIMENT

Figure 1:
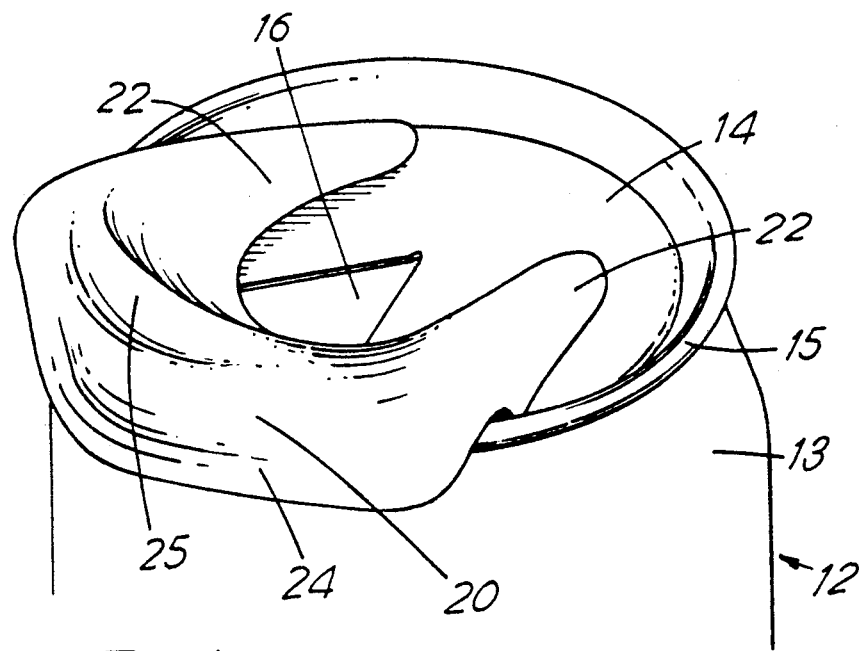
FIG. 1 is a perspective diagrammatic view of the top of a drinks can with a drinking device located thereon.

A can 12 containing drink has a circular sectioned cylindrical side wall 13, a top 14 and an upstanding circular rim 15 around the top surface. The top surface defines a pear shaped opening 16, normally formed by removal or partial breaking of a weakened portion attached to a pull ring. The pull ring and weakened portion provide an opening means.

A drinking device 20, made from moulded, slightly resilient plastics material, comprises a generally horizontally extending portion 21 having two arms 22 defining between them a channel 23 which is aligned with the opening 16, a generally vertically extending portion 24 curved to engage against the cylindrical side wall of the can and a curved rim portion 25 defining a downwardly opening channel 26, part of which is dimensioned to receive the can rim 15 as a close fit. The drinking device clips onto the can to cover the can surfaces adjacent the opening so that the lips of a person drinking from the can will touch the drinking device but not the can. The outer surfaces of the rim and portions 21 and 24 are smoothly shaped and curved to be comfortably received in and adjacent a drinker's mouth and there are no upstanding or angular parts. The portion 24 tapers downwardly and inwardly.

Figure 2:
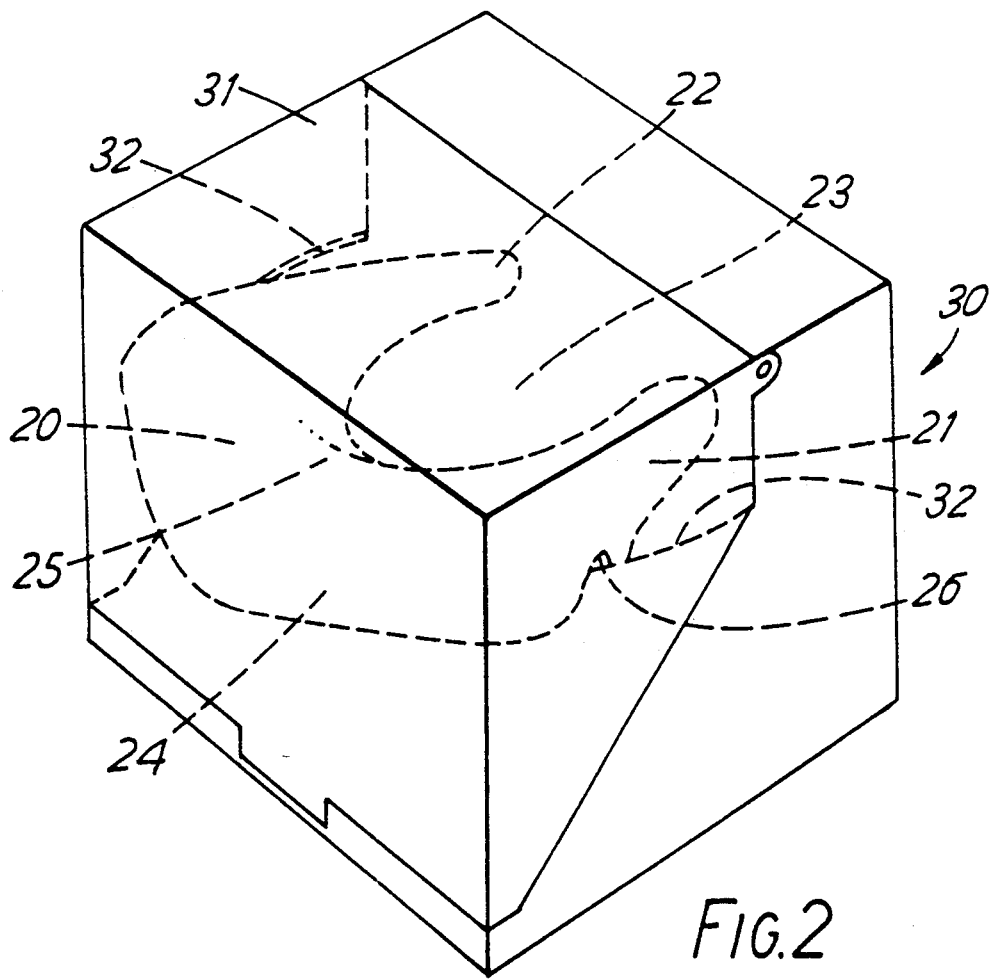
FIG. 2 is a perspective diagrammatic view of a holder for mounting the drinking device when not in use.
Figure 3:
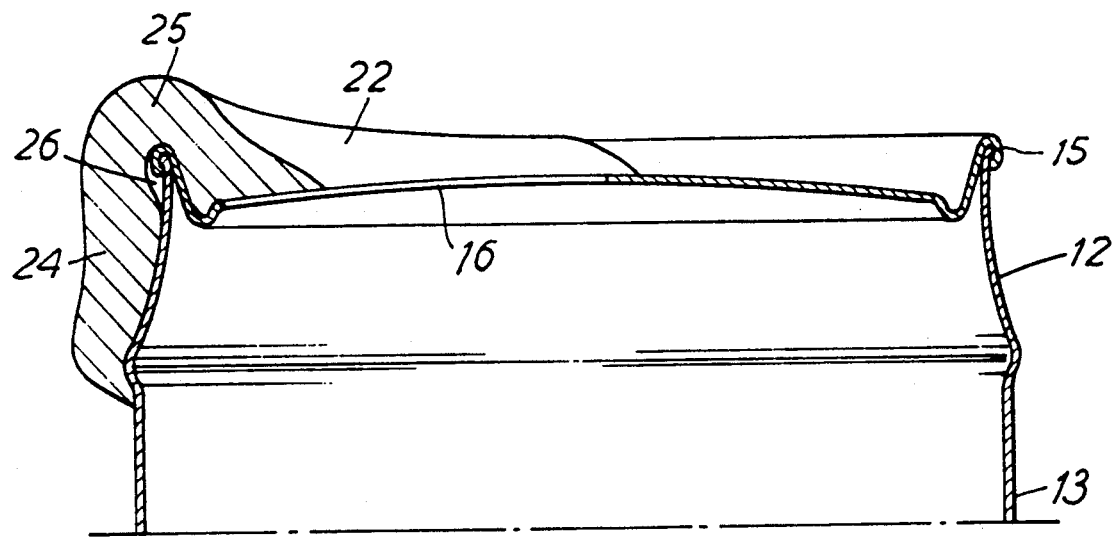
FIG. 3 is a sectional elevation on an enlarged scale through the top of a can with a drinking device.
Figure 4:
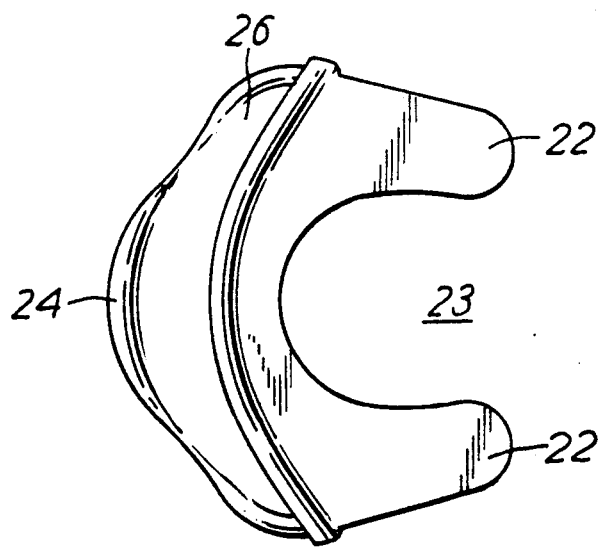
FIG. 4 is an underneath plan view of the drinking device.

FIG. 2 shows a holder 30 for mounting the device when it is not in use. The holder comprises a box having a hinged lid portion 31 which can be opened to gain access to the inside or closed to prevent entry of dirt, dust or the like. The holder has a mounting portion 32 with a rim, shaped like the portion of a can around the opening, so that the drinking device can be mounted on it in the same manner as it is mounted on a can for use. Any dirt which the lower surface of the drinking device has picked from the can in use should not be transferred to the upper surface which contacts the mouth of the user as it is transferred between the drinking device, the holder and back to another drinking device. The holder may include means for fixing it to a surface of a car or other surface to which it is to be mounted.

The drinking device may be inscribed with the name of the owner or any other logo or information.

What is claimed is:

1. In combination, a drinking device for use with a can having a top surface defining or having opening means adapted to define a can opening and an upstanding rim around the top surface, and a holder for the drinking device; the drinking device having a portion shaped to clip onto the rim of the can in the region of the can opening and a portion shaped to provide a cover over areas of the can surface adjacent the opening whilst leaving the opening free for egress of liquid therefrom, the holder comprising a closable and openable container having within the container a part of similar shape to a portion of a rimmed cylindrical drink can adjacent its opening and adapted to accommodate the drinking device mounted on said part.

2. For use with a can containing a drink, a combination of a drinking device and a holder for the drinking device; the drinking device comprising a generally horizontally extending portion adapted to contact a can opening for passage of a drink, a generally upright portion shaped to contact a cylindrical side of a can below the opening, the generally horizontal and upright portions being connected by a rim portion defining a downwardly opening channel shaped to clip over a rim of the can so as to detachably retain the drinking device to the can, and the holder comprising a closable and openable container having within the container a part of similar shape to a portion of a rimmed cylindrical drink can adjacent its opening and adapted to accommodate the drinking device mounted on said part.

3. A drinking device according to claim 2 in which the drinking device has outer surfaces which are smoothly curved to be comfortably received in and adjacent a drinkers mouth.

* * * * *